United States Patent
Stinchcombe et al.

(10) Patent No.: US 11,543,270 B2
(45) Date of Patent: Jan. 3, 2023

(54) ELECTRONIC DEVICE

(71) Applicant: RENISHAW PLC, Wotton-under-Edge (GB)

(72) Inventors: Jason Lee Stinchcombe, Mitchel Troy (GB); Ian Lee Eldred, Nailsea (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 15/025,509

(22) PCT Filed: Sep. 26, 2014

(86) PCT No.: PCT/EP2014/070623
§ 371 (c)(1),
(2) Date: Mar. 28, 2016

(87) PCT Pub. No.: WO2015/049176
PCT Pub. Date: Apr. 9, 2015

(65) Prior Publication Data
US 2016/0238417 A1    Aug. 18, 2016

(30) Foreign Application Priority Data

Oct. 1, 2013  (EP) ..................................... 13275240

(51) Int. Cl.
   *G01D 11/24*   (2006.01)
   *G01D 5/347*   (2006.01)
   *G01D 5/26*    (2006.01)

(52) U.S. Cl.
   CPC ........... *G01D 11/245* (2013.01); *G01D 5/264* (2013.01); *G01D 5/34715* (2013.01)

(58) Field of Classification Search
   CPC ... G01D 5/264; G01D 11/245; G01D 5/34715
   USPC ............ 250/231.13, 231.14, 231.15, 231.16, 250/231.17, 231.18
   See application file for complete search history.

(56) References Cited

U.S. PATENT DOCUMENTS

| | | |
|---|---|---|
| 2,967,957 A | 1/1961 | Massa |
| 5,026,985 A | 6/1991 | Ishizuka et al. |
| 5,569,913 A | 10/1996 | Ishizuka et al. |
| 5,764,125 A | 6/1998 | May |

(Continued)

FOREIGN PATENT DOCUMENTS

| | | |
|---|---|---|
| CN | 1289435 A | 3/2001 |
| CN | 101335334 A | 12/2008 |

(Continued)

OTHER PUBLICATIONS

"Annotated Photograph Believed to Depict Canon SR Encoder Sold at Least Before 2012".

(Continued)

*Primary Examiner* — Thanh Luu
(74) *Attorney, Agent, or Firm* — Oliff PLC

(57) ABSTRACT

A method of assembling a device including, taking a casing including a body having an opening and a lid for the opening, locating at least one electronic component within the body; locating a first end of a cable for electrically connecting the electronic component within the body to an external device, and deforming at least one of the body and the lid so as to secure the lid to the body and such that the cable is secured to the casing by the lid.

9 Claims, 5 Drawing Sheets

(56) References Cited

U.S. PATENT DOCUMENTS

| | | | |
|---|---|---|---|
| 6,257,907 B1 | 7/2001 | Feichtinger | |
| 6,482,046 B1 * | 11/2002 | Salinas | H01R 13/506 |
| | | | 439/677 |
| 6,520,019 B1 | 2/2003 | Schon et al. | |
| 6,605,828 B1 | 8/2003 | Schwarzrock et al. | |
| 6,797,878 B1 * | 9/2004 | Radelet | G02B 6/4447 |
| | | | 174/17 R |
| 7,316,071 B2 * | 1/2008 | Harrer | G01D 5/264 |
| | | | 33/1 L |
| 9,012,831 B2 | 4/2015 | Riepertinger | |
| 2005/0145242 A1 * | 7/2005 | Romeu | A47J 36/28 |
| | | | 126/263.09 |
| 2008/0316111 A1 | 12/2008 | Aoyama et al. | |
| 2010/0062641 A1 * | 3/2010 | Maruyama | H01R 13/6277 |
| | | | 439/582 |
| 2013/0294031 A1 * | 11/2013 | Nagata | G01D 5/24433 |
| | | | 361/714 |

FOREIGN PATENT DOCUMENTS

| | | |
|---|---|---|
| CN | 101369489 A | 2/2009 |
| CN | 201633975 U | 11/2010 |
| CN | 102148441 A | 8/2011 |
| CN | 202495261 U | 10/2012 |
| CN | 202 533 211 U | 11/2012 |
| CN | 103038021 A | 4/2013 |
| DE | 195 43 372 A1 | 5/1997 |
| DE | 199 13 262 A1 | 9/2000 |
| DE | 202 18 228 U1 | 4/2004 |
| EP | 0 610 869 A1 | 8/1994 |
| EP | 1 566 863 A2 | 8/2005 |
| EP | 1045227 B1 | 1/2007 |
| JP | S52-124606 U | 9/1977 |
| JP | H03-115920 A | 5/1991 |
| JP | H08-116206 A | 5/1996 |
| JP | H09-74291 A | 3/1997 |
| JP | H11-121968 A | 4/1999 |
| JP | 2004-221421 A | 8/2004 |
| JP | 2006-216914 A | 8/2006 |
| JP | 2006-333573 A | 12/2006 |
| JP | 2009-188968 A | 8/2009 |
| JP | 2011-113928 A | 6/2011 |
| JP | 2013-167574 A | 8/2013 |
| JP | 2013-171045 A | 9/2013 |
| JP | WO2012-108021 A1 | 7/2014 |

OTHER PUBLICATIONS

"Annotated Diagram of Renishaw's RG1 Head Sold at Least Before 2012".
"Annotated Photograph of Renishaw's TONiC Readhead Sold at Least Before 2012".
"Ultra Miniature Optical Encoder SR Series," Canon U.S.A., Inc. (Jan. 2011).
"Red Point Source LED Chip MED7P4," Daido Steel Co., Ltd. (Mar. 2009).
"Optoelektronische Sensoren fur die Weg- und Winkelmessung," Reiner Burgschat, published before 2012.
Jul. 4, 2017 Office Action issued in Chinese Application No. 201480065606.1.
Updated English translation of DE 202 18 228 U1.
May 3, 2018 Office Action issued in Chinese Application No. 201480065606.1.
Aug. 14, 2018 Office Action issued in Japanese Application No. 2016-519748.
Jan. 30, 2015 Search Report issued in International Patent Application No. PCT/EP2014/070623.
Jan. 30, 2015 Written Opinion issued in International Patent Application No. PCT/EP2014/070623.
Apr. 4, 2014 Search Report issued in European Patent Application No. 13 27 5240.

\* cited by examiner

ELECTRONIC DEVICE

This invention relates to an electronic device, such as a measurement device, and in particular to a readhead for a position measurement encoder.

Many electronic devices, in particular measurement devices such as position measurement encoders comprise a casing for electronics and cable extending from it in order to connect the electronics to another device such as a processor or a controller. In the case of a position measurement encoder, a readhead configured to read a scale comprises detectors for detecting a signal from a scale (e.g. an optical, magnetic, capacitive or inductive signal). A cable carries signals from the readhead to a processor device such as a controller. The cable could also carry signals and/or power to the readhead.

It is important that the cable is adequately clamped to the casing such that forces on the cable are not transferred in full to the electronics within the casing and/or do not cause the cable to disconnect from the electronics and/or body.

There are various current solutions for securing a cable to an electronic device, in particular readheads for an encoder apparatus, such as is disclosed in U.S. Pat. No. 7,316,071, EP0610869 and DE19543372.

The present invention provides an improvement in the way in which cables are secured to the body of an electronic device. In particular the invention provides an improved method for assembling an electronic device and an associated electronic device.

According to a first aspect of the invention there is provided a method of assembling a device comprising: taking a casing comprising a body with an opening and a lid for the opening, locating at least one electronic component within the body; locating a cable for electrically connecting the electronic component to an external device, deforming at least one of the body and the lid so as to secure the lid to the body and such that the cable is secured to the casing. Preferably, the cable is secured to the casing by the lid. Preferably, the lid compresses the cable so as to secure it to the casing.

Accordingly, the lid for the device and the cable can together be secured to the body without the use of screws or other third party fasteners. This can help to reduce the size of the device and improve the ease of manufacture. It can also reduce the number of parts needed, help reduce cost and provide anti-tamper qualities.

As will be understood, at some point the cable can be connected to the electronic component. This can be prior to location of the electronic component and/or end of the cable within the body or after at least one of the electronic component and end of the cable has been located within the body. As will be understood, in the embodiments in which the lid closes the body's opening so as to prevent access to the electronic component and cable, such connection should be before the lid is fastened to the body.

At least one of the lid and body define a channel through which the cable passes, (i.e. from the inside to the outside of the casing). For instance, at least one the lid and the body define an open (e.g. an open-topped) channel. For example, the channel can be substantially U-shaped. This can be advantageous because it can mean that the cable can be inserted into the channel in a direction transverse to the cable's and the channel's length, e.g. such that the cable can be pressed into the channel through the open top end of the U-shape rather than having to be fed through the channel along its length. The channel's cross-sectional shape and size can be such that the cable is a snug fit within the channel. As will be understood, the channel's cross-sectional shape and size can be such that the cable is a compressed within the channel when the lid is assembled onto the body. Such an arrangement can aid assembly. Not only does it avoid fiddly threading of a cable through a hole, but it can also mean that the cable can have a connector pre-installed on its end, before the cable and body are assembled together. Accordingly, rather than an assembler having to wire the cable to a connector in the body, this can be done beforehand. Accordingly, the method can comprise, wiring the cable to a connector at its end that is to be located within the body, before locating the cable within the body's channel. Optionally, the body defines the channel.

The underside of the lid can be pressed against the cable such that cable is compressed, e.g. squashed, between the lid and the body. The cable can deform under such compression between the lid and body. As will be understood, the cable can comprise an outer protective sheath. Preferably, the sheath is deformed under such compression between the lid and body. The sheath can be made from a relatively flexible material, for example polyurethane (PUR), Ethylene tetrafluoroethylene (ETFE).

The lid can be substantially flat, e.g. substantially planar. Optionally, the lid, for example its underside can be profiled, for example profiled so as to have features which help engage with the cable. For example, as mentioned above, the underside of the lid can define a channel through which the cable can pass. Preferably, there is minimal and more preferably substantially no deformation of the lid. Accordingly, preferably the lid is rigid, and made from a relatively stiff material, for example stainless steel. In particular, preferably the lid and body are more rigid than the cable, and in particular more rigid than the cable's sheath such that the cable, and in particular the sheath, tends to deform instead of, or at least substantially more than, the lid and the body.

The lid and/or body can comprise at least one grip feature configured to enhance engagement between the lid and the body. Such at least one grip feature can be provided at the location(s) (e.g. point(s), region(s)) at which the body and/or lid is deformed. Such grip features can be configured to provide at least one pressure point between the lid and the body at the location(s) the body and/or lid is deformed. For example, the lid and/or body can comprise at least one projection, indent, and/or roughened area. The lid and/or the body can comprise at least one ribbed region. Such at least one feature can be provided on the edge of the lid.

The lid can comprise a plurality of such features positioned around the edge of the lid. Such at least one feature can be provided on the body's at least one flange. The perimetral flange can comprise a plurality of such features positioned around the body's perimetral flange.

As will be understood, the at least one electronic component can be located within the body via the body's opening. Likewise, one end of the cable can be located within the body via the body's opening.

Deforming can comprise crimping at least one of the body and lid. Optionally, deforming comprises deforming only one of the body and lid. For example, deforming can comprise deforming the body only. The method can comprise deforming the body at discrete points about the lid so as to secure the lid to the body. Preferably, the method comprises deforming the body and/or lid at a plurality of discrete points contemporaneously. Preferably, the method comprises deforming the body and/or the lid at least at one point proximal the cable and at least at one point distal to the cable. The method can comprise applying a force to the lid so as to prevent deformation of the lid during the assembly process. For example, the method can comprise applying a force to a planar face of the lid so as to press the lid into the cable and hence cause substantial deformation of the cable as opposed to the lid.

Optionally, no intermediate component or composition is used to secure the lid to the body. For example, optionally no adhesive is used to secure the lid to the body.

At least one flange can be provided on the body and/or the lid. The method can comprise deforming the at least one flange so as to secure the lid to the body. The at least one flange can be part of, for example define, the body's opening, for example the upper edge of the body's opening. The at least one flange can comprise a perimetral flange. For example, the at least one flange can extend at least partly around the perimeter of the body's opening. Optionally, the at least one flange can extend at least partly around the perimeter lid. The at least one flange can be arranged such that at least one flange exists at various points around the perimeter of the lid and/or opening, for instance at least on opposing sides of the opening and/or lid. The perimetral flange need not necessarily be continuous, for instance it can be broken/segmented.

The body can comprise a perimetral flange. The lid can be received into the space defined by the perimetral flange. The at least one flange, for example the perimetral flange can be part of, for example define, the body's opening, for example the upper edge of the body's opening. The lid can be received into the space defined by the perimetral flange. The body can comprise a seat, for example a lip or ledge, for the lid. The method can comprise deforming at least one flange, for example the perimetral flange so as to crimp the lid to the body, (e.g. so as to secure the lid to the body). Accordingly, the lid could be clamped around the edges of the lid. The lid could be compressed by such crimping/clamping. The lid could be compressed between opposing flanges/sides of the perimetral flange, and/or compressed between at least one flange and the seat.

The lid can be used to close the body, e.g. so as to prevent access to one or more parts within the casing. The lid can protect the at least one electronic component. When assembled, the lid and body can together prevent physical access to the electronic component. The lid can, but not necessarily, be used to seal the electronic components from external contaminants.

When assembled the lid can squash the cable against the body, for example squash the cable in the channel. Such compression of the cable can clamp the cable to the body. The lid and/or body can be in direct contact with the cable, in particular the cable's outer protective sheath. In other words, optionally, no additional third party component, such as a ferrule, is used to secure the cable to the casing.

The channel can comprise features configured to aid gripping of the cable. For example, the channel's cross-sectional shape can comprise features configured to bite into the cable's sheath, e.g. when the lid is secured onto the body and the cable is compressed/squashed between the lid and body. As will be understood, this doesn't necessarily mean that the features pierce or cut into the cable's sheath, but such features could instead provide pressure points which aid gripping of the cable. In other words, the channel's cross-sectional shape can be configured to provide pressure points on the cable's sheath. For example, the channel's cross-sectional shape can be stepped. For example, the channel's cross-sectional shape can comprise edges configured to engage with the cable's sheath. However, as will be understood, the features could be configured to pierce into the sheath. For example, the features could piece/cut into the sheath sufficiently so as to contact the shielding within the cable, hence connecting the body to the shielding.

The method can comprise applying a force onto the lid during said deforming of at least one of the body and lid, so as to maintain the position of the lid. Such force can be applied in a direction such that the lid pushes the cable into the channel.

The cable can comprise shielding. The method can comprise electrically connecting the shielding to the casing, e.g. the body and/or the lid. Such an electrical connection can be provided by a physical/mechanical connection between the shielding and the casing, e.g. the body and/or the lid. The method can comprise locating a length of the cable's shielding between the cable's outer sheath and the casing, e.g. the body and/or the lid. This can be such that when the lid is applied to the body, the shielding is squeezed between the cable's sheath and the casing, e.g. the body and/or the lid, so as to provide said electrical connection.

The electronic device can comprise a position measurement device, in particular an encoder readhead configured to read a scale.

Accordingly, this application describes, a method of assembling a device comprising: taking a housing containing at least one electronic component and a cable attached thereto which protrudes through a channel in the housing, taking a lid for the housing, deforming at least one of the housing and lid so as to secure the lid to the housing and such that the cable is held in the channel.

According to a second aspect of the invention there is provided an electronic device comprising: a casing containing at least one electronic component, the casing comprising a body and a lid secured to the body; a cable connected at a first end to the at least one electronic component in the casing and having a second end located outside the casing; in which at least one deformation in the body and/or the lid secures the lid and the cable to the body. Preferably, the cable is secured to the casing by the lid.

The electronic device can comprise an encoder readhead configured to read a scale.

An embodiment of the invention will now be described, by way of example only, with reference to the following drawings in which.

Figure 1:
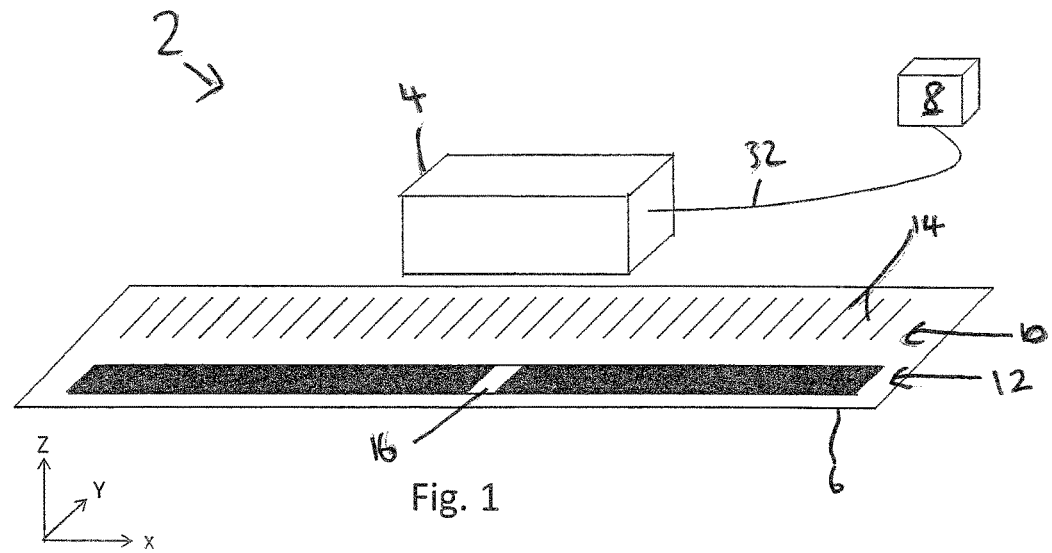
FIG. 1 shows a schematic view of an encoder comprising a readhead and a scale.

Referring to FIG. 1 there is shown a readhead 4 which is part of a position measurement encoder apparatus 2. The position measurement apparatus also comprises a scale 6.

Although not shown, typically in practice the readhead 4 will fastened to one part of a machine and the scale 6 to another part of the machine which are movable relative to each other. The readhead 4 is used to measure the relative position of itself and the scale 6 and hence can be used to provide a measure of the relative position of the two movable parts of the machine. In particular, the readhead 4 is configured to read the scale 6 such that their relative position and/or motion can be determined. In this embodiment the position measurement encoder apparatus is an optical encoder, in that the readhead 4 utilises electromagnetic radiation (EMR) in the infra-red to ultraviolet range in order read the scale 6. In particular, in this described embodiment, the position measurement encoder apparatus is an optical incremental encoder. However, as will be understood, the position measurement encoder apparatus need not necessarily be an incremental encoder. For example, it could be an absolute optical encoder. In this case, the scale can comprise a series of uniquely identifiable features, e.g. codes, which the readhead can read to determine a unique position along the length of the scale.

As will also be understood, the position measurement encoder apparatus need not necessarily be an optical encoder. For instance, it could be a magnetic, inductive, or capacitive encoder. As will be understood, in these cases the readhead utilises changes in magnetic, inductive or capacitive properties in order to read a scale.

Typically, the readhead 4 communicates with a processor such as a controller 8 via a wired (as shown) and/or wireless communication channel. The readhead 4 can report the signals from its detectors (described in more detail below) to the controller 8 which then processes them to determine position information and/or the readhead 4 can itself process the signals from its detectors and send position information to the controller 8.

As mentioned above, in the embodiment described the encoder apparatus 2 is an incremental encoder apparatus and the scale 6 comprises an incremental scale track 10 and a separate reference mark track 12. The incremental track 10 comprises a series of periodic scale marks 14 which control the light reflected toward the readhead 4 to effectively form a diffraction grating. The incremental track 10 could be what is commonly referred to as an amplitude scale or a phase scale. As will be understood, if it is an amplitude scale then the features are configured to control the amplitude of light transmitted toward the readhead's incremental detector (e.g. by selectively absorbing, scattering and/or reflecting the light). As will be understood, if it is a phase scale then the features are configured to control the phase of light transmitted toward the readhead's incremental detector (e.g. by retarding the phase of the light). In the present embodiment, the incremental track 10 is an amplitude scale, but in either case, as explained in more detail below, the light interacts with the periodic scale marks 14 to generate diffracted orders. These diffracted orders then interact with a diffraction grating 26 provided by the readhead 4 (explained in more detail below) which then form a resultant signal on the readhead's incremental detector 36 such that relative motion can be detected and measured.

The reference track 12 comprises a reference position defined by a reference mark 16 which in this case provides a contrast feature compared to the rest of the reference track 12. As will be understood, many other types of reference mark are possible, including reference marks that are embedded within the incremental scale track. Reference positions can be useful to enable the readhead 4 to be able to determine exactly where it is relative to the scale 6. Accordingly, the incremental position can be counted from the reference position. Furthermore, such reference positions can be what are also referred to as "limit positions" in that they can be used to define the limits or ends of the scale 6 between which the readhead 4 is permitted to travel.

Figures 2A, 2B:
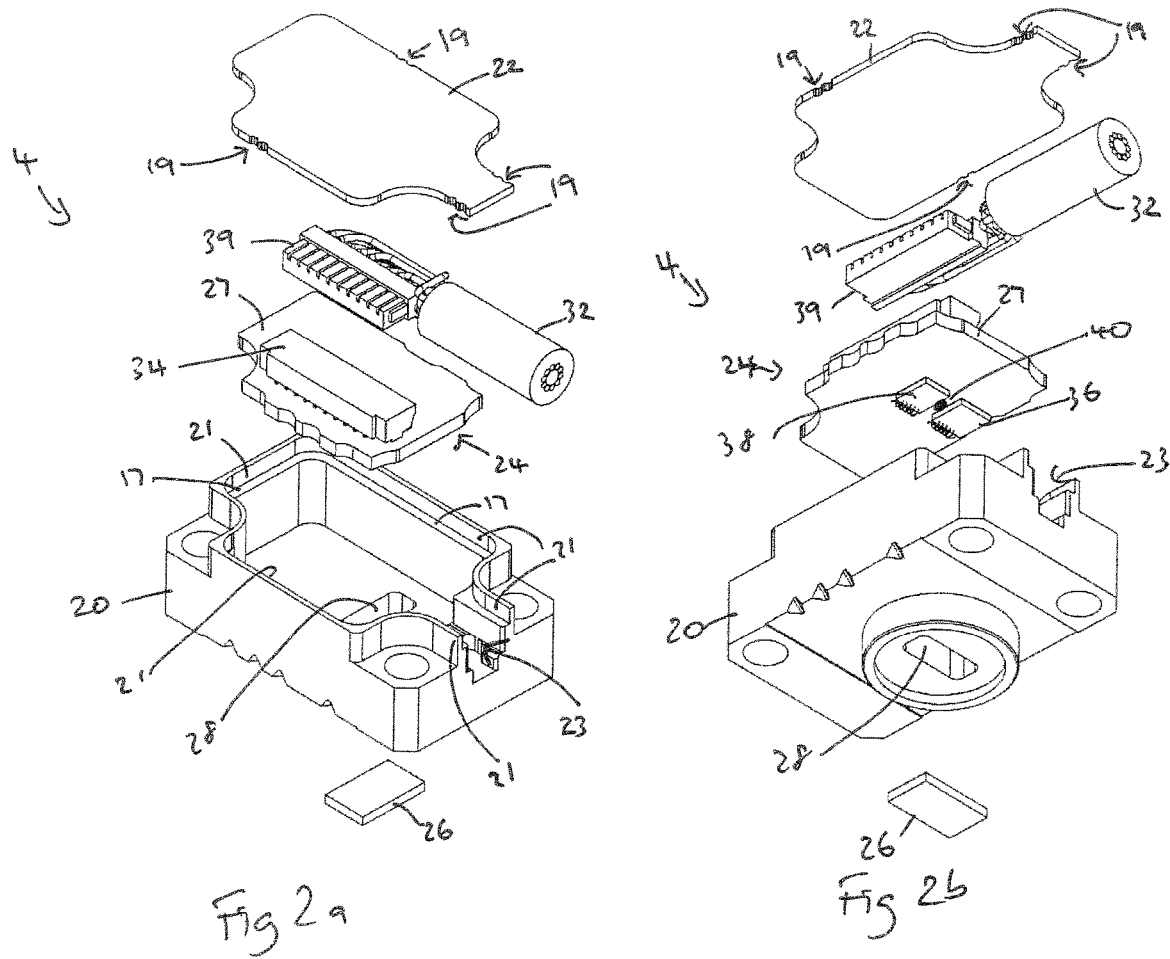
FIGS. 2a and 2b show top and bottom exploded views of a readhead according to the invention.

Referring to FIGS. 2a and 2b, the readhead 4 comprises a casing made up of a body 20 and a lid 22. The casing is for protecting a printed circuit board (PCB) assembly 24 which when in use is contained within and protected by the body 20 and the lid 22. As shown, the readhead 4 also comprises a glass plate 26 on part of which a diffraction grating is formed. The body 20 comprises a perimetral flange 21 which extends around the upper edge of body and defines an opening via which the PCB assembly 24 can be received in the body 20A perimetral ledge 17 extending around the bottom of the perimetral flange 21 provides a seat for the lid 22. The PCB assembly 24 comprises a PCB 27 and an incremental photodetector 36, a reference mark photodetector 38, a light source 40 and associated processing electronics, mounted on the PCB 27. A window region 28 on the underside of the body is configured to receive the glass plate 26 comprising the diffraction grating. A cable 32 (having a pre-installed cable connector 39 which is configured so as to be connected to a PCB assembly connector 34 on the PCB 27) is provided for carrying power and/or signals to and from the PCB assembly 24.

An open, generally U-shaped channel 23 is provided at one end of the body 20 through which the cable 32 can pass so that it can be connected at another end to another device, e.g. a processor such as controller 8. At this end, the lid 22 and the perimetral flange 21 narrow to a neck-like region. Such a neck region proximal where the cable 32 passes helps to improve clamping of the cable 32 and in particular helps to avoid deformation of the lid 22.

In the embodiment described, the body 20 is made from aluminium and the lid 22 is made from stainless steel. As will be understood, the body and the lid can be made from various different materials and are not limited to being made from aluminium and/or stainless steel. However, it can be advantageous (but it is not essential) for the lid to be made such that it is relatively stiff (e.g. it can be made from a relatively stiff material such as stainless steel) so as to avoid/minimise deformation (i.e. so that the cable as opposed to the lid deforms) and the body to be made such that at least the perimetral flange 21 can be deformed relatively easily so as to facilitate crimping (explained in more detail below).

As described in more detail below, once the readhead 4 has been assembled, the PCB assembly 24 sits within the body 20 and the lid 22 sits on the ledge 17 such that it is surrounded by the perimetral flange 21. The lid 22 is secured to the body 20 by bending/deforming of the perimetral flange 21 at select points 25 such that lid 22 is crimped onto the body 20 thereby containing and protecting the PCB assembly 24 within the body 20.

In operation, with respect to the incremental track 10, light from the source 40 leaves the readhead 4 via a portion of the glass plate 26 that does not contain the diffraction grating and falls on the periodic scale marks 14, which define a diffraction pattern. The light therefore diffracts into multiple orders, which then fall on the part of the glass plate 26 containing the diffraction grating. In the present embodiment, the readhead's diffraction grating is a phase grating. The light is then further diffracted by the readhead's diffraction grating into orders which then interfere at the incremental photodetector 36 to form a resultant field, in this case an interference fringe. As will be understood, relative movement of the scale 6 and readhead 4 causes changes in the interference fringe which are detected by the incremental photodetector 36 which can be used to determine relative motion and hence position.

With respect to the reference mark track 12, when the readhead 4 passes over the reference mark 16, a change in light received at the reference mark photodetector 38 (and in this case an increase in light received at the reference mark photodetector 38) occurs, which can be detected and used to determine a reference position.

Figure 3A:
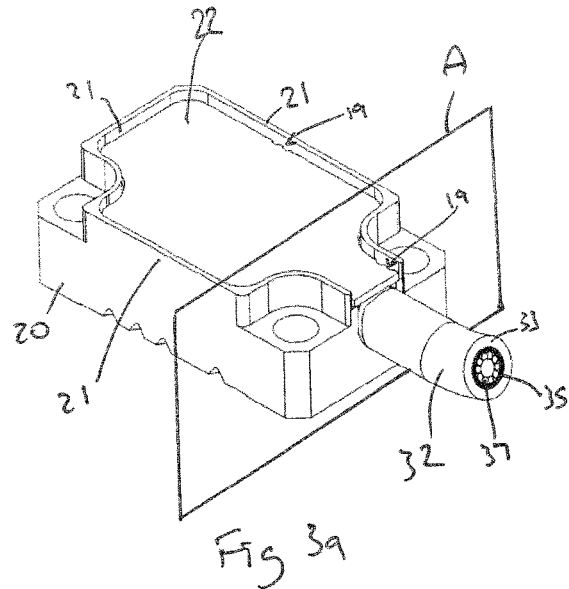
FIGS. 3a and 3b illustrate isometric and cross-sectional views of a readhead according to the invention before the readhead's lid has been secured to the readhead's body.
Figure 3B:
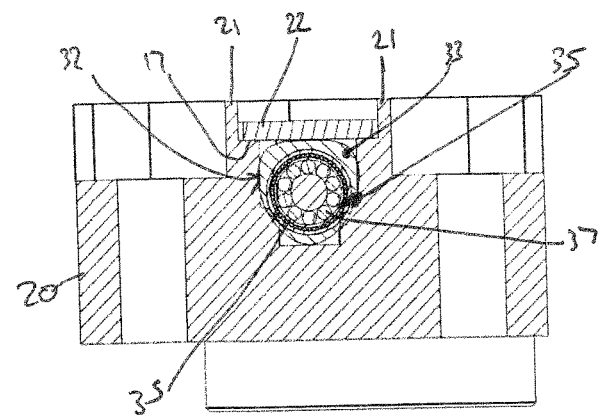
Figure 4A:
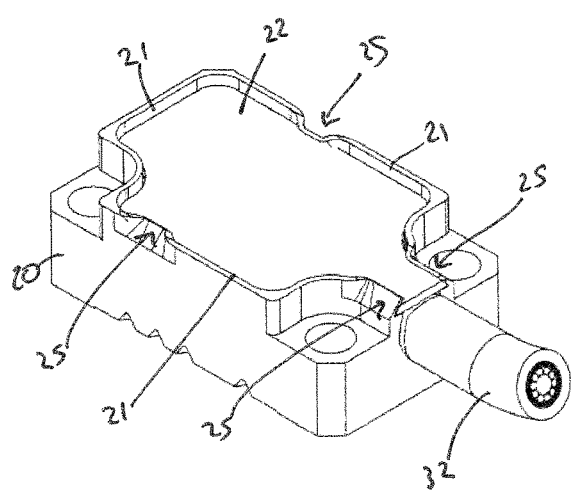
FIGS. 4a and 4b illustrate isometric and cross-sectional views of a readhead according to the invention after the readhead's lid has been secured to the readhead's body.
Figure 4B:
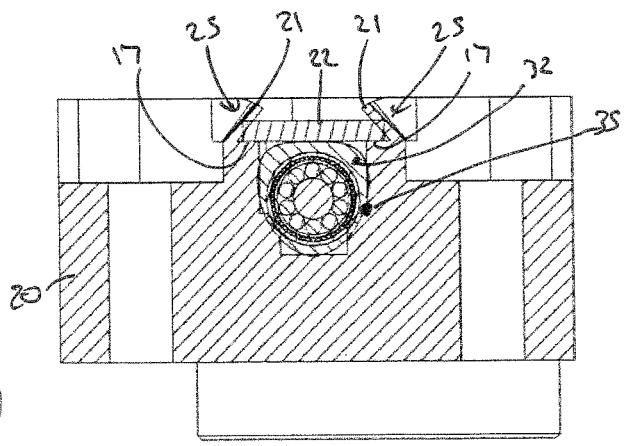

Referring to FIGS. 3 and 4 there is shown the readhead of FIGS. 1 and 2 in an assembled state (in FIG. 4 the perimetral flange 21 has been deformed at select points 25 so as impinge on the lid 22 so as to hold it onto the body, whereas in FIG. 3 such deformation has not yet taken place). FIGS. 3a and 4a show isometric views of the readhead 4, whereas FIGS. 3b and 4b show cross-sectional views of the readhead taken in plane A (at the neck region of the perimetral flange 21 where the cable 32 passes through the channel 23).

As shown in FIGS. 3b and 4b, when the lid 22 is located on the body 20, the cable 32 is compressed/squashed within the channel 23. As illustrated, the cross-sectional shape and/or area of the channel 23 is such that the cable 32 is anchored within the channel 23 by virtue of being compressed within the channel. In particular, the cable 32 comprises a sheath 33 surrounding braided shielding 35 and signal lines 37. The sheath 33 deforms within the channel 23 due to the compressive forces. In the described embodiment, the cross-sectional shape of the channel 23 narrows towards its bottom, in particular in a step-wise manner. The corners of the steps bite onto (but in this case not into—but as explained above the steps could piece/cut into the sheath if so configured) the deformable sheath 33 which help to clamp the cable 32 to the body 20. A length of the cable's braided shielding 35 at its end is twisted together and turned back on and over the end of the sheath 33 and located so as to be squeezed between the sheath 33 and the body 20 so as to electrically connect the body 20 and the shielding 33.

Referring back to FIGS. 2a and 2b, the lid comprises a number of (in this case four) ribbed regions 19 located around the perimetral edge of the lid 22. These ribbed regions 19 are each positioned such that there is one located at each point 25 where the body's 20 perimetral flange 21 is deformed onto the lid 22. Such ribbed regions 19 help the deformed point 25 of the flange 21 to engage with the lid 22, thereby helping to secure the lid 22 to the body 20 and in particular to help prevent the lid 22 from sliding around on the ledge 17.

Figure 5:
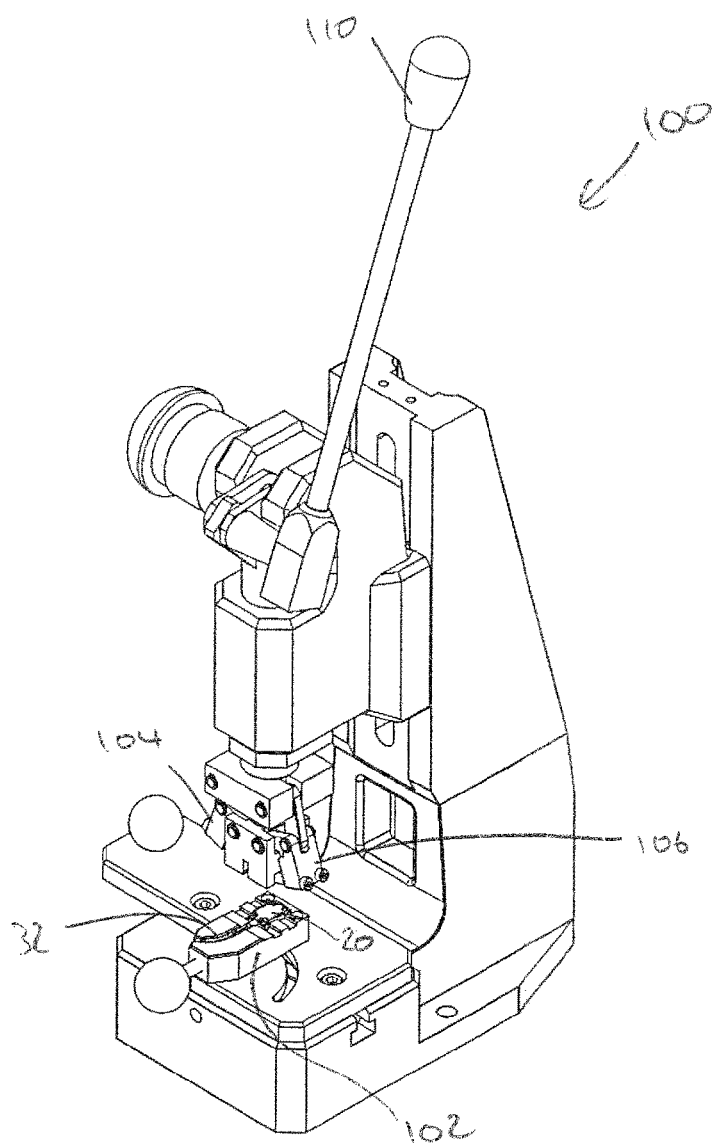
FIG. 5 illustrates an apparatus suitable for securing the readhead's lid to the readhead's body according to the present invention.

FIG. 5 illustrates a crimping tool 100 for securing the lid 22 to the body 20. As shown in FIGS. 5 and 6, the crimping tool 100 comprises a holder 102 for the body 20 and cable 32, a lid press 108, first lateral press 104 and a second lateral press 106, and a handle 110. The operation of the crimping tool 100 will be explained in more detail below in connection with FIG. 7. As will be understood, the terms "first" and "second" used in connection with "first lateral press" and "second lateral press" are used for the mere identification to two different press and not to indicate order of operation of the two lateral presses. Indeed, in the embodiment described below, the first and second lateral presses are operated simultaneously so as to balance the forces applied to the body. However, as will be understood, this need not necessarily be the case and they could be operated one after the other.

Figure 7:
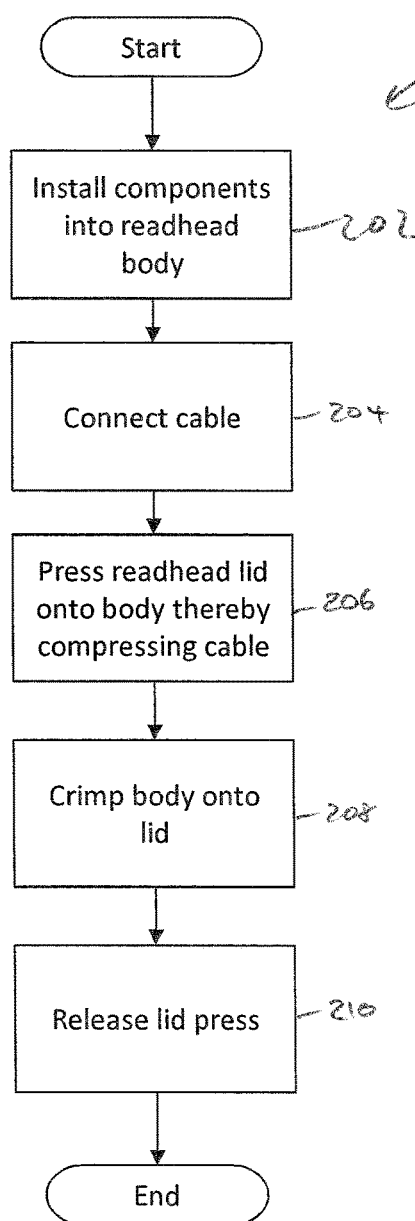
FIG. 7 is a flow chart illustrating the steps of assembly of a readhead according to the present invention.
Figure 6A:
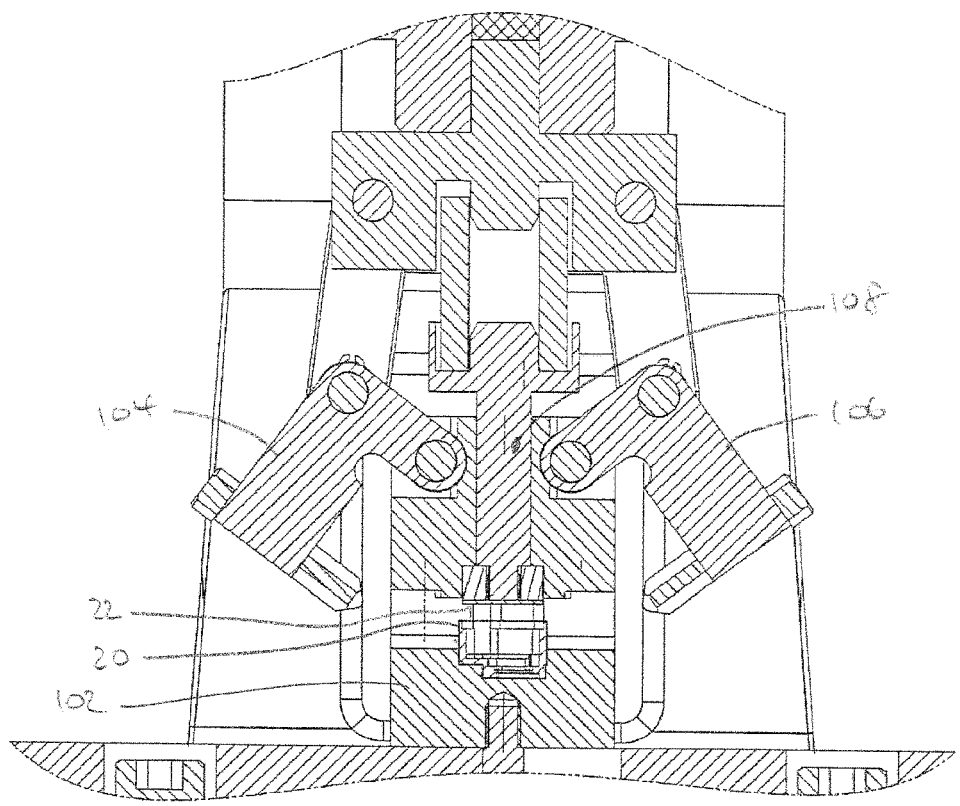
FIGS. 6a to 6c illustrate cross-sectional views of the apparatus of FIG. 5 and the readhead of FIGS. 2 to 4 at various stages during the assembly procedure.
Figure 6B:
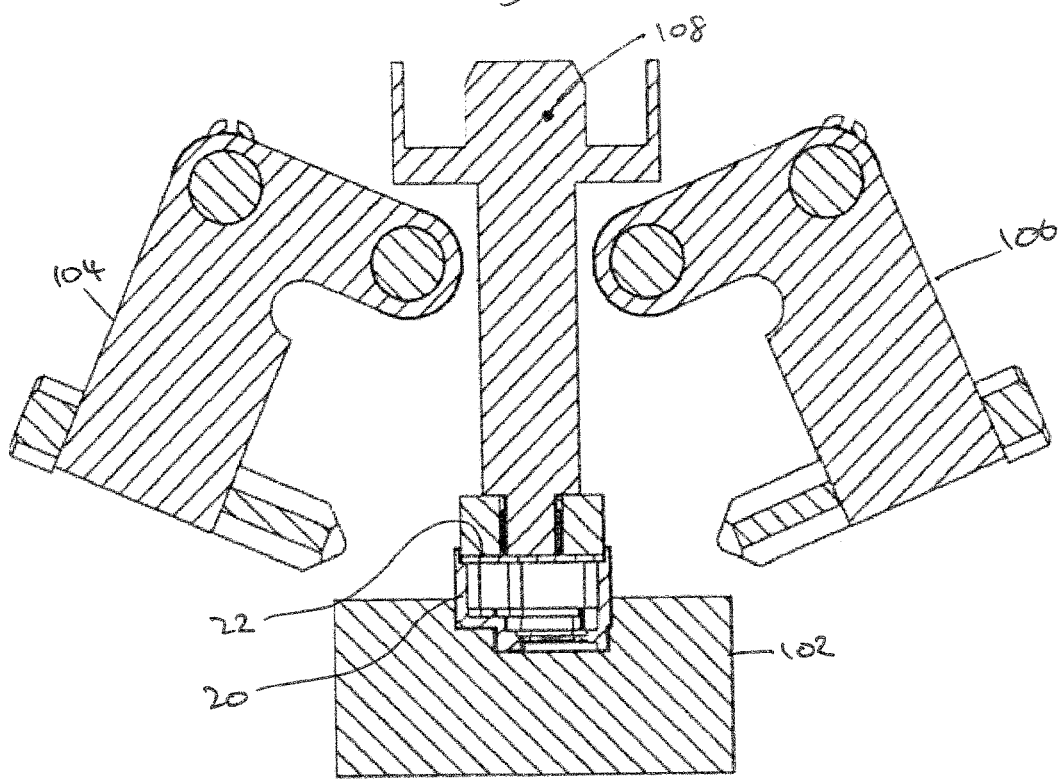
Figure 6C:
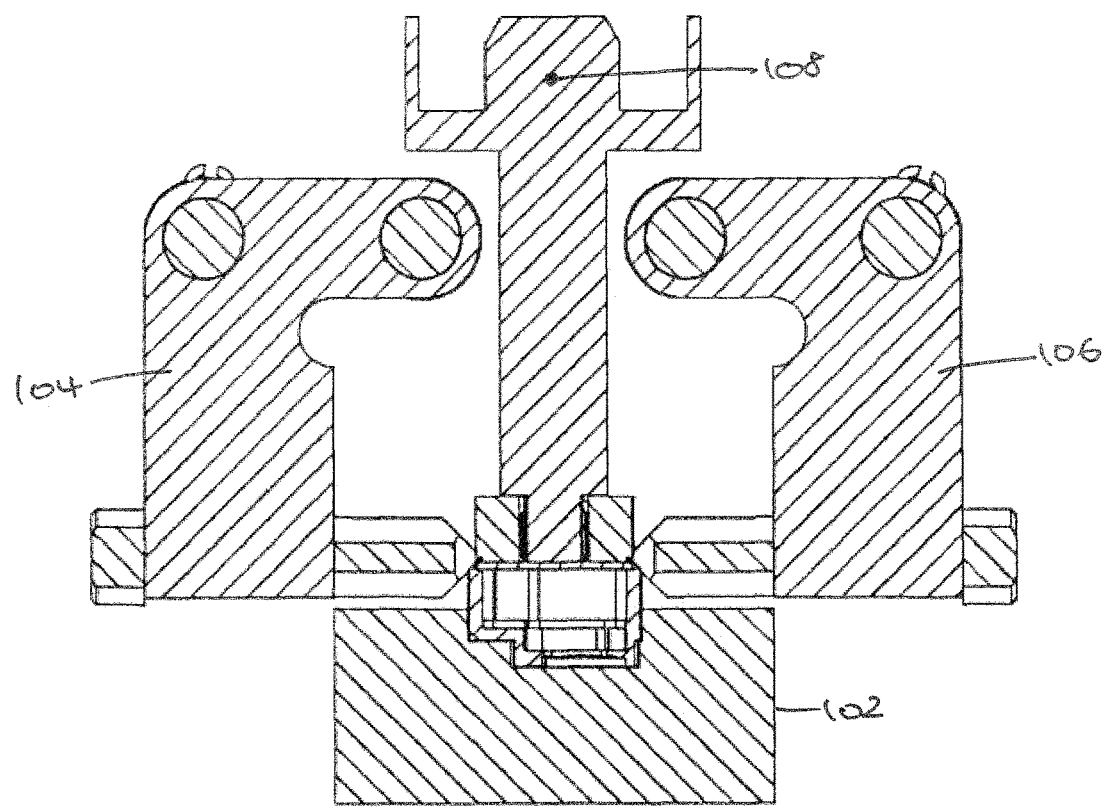
Figure 6D:
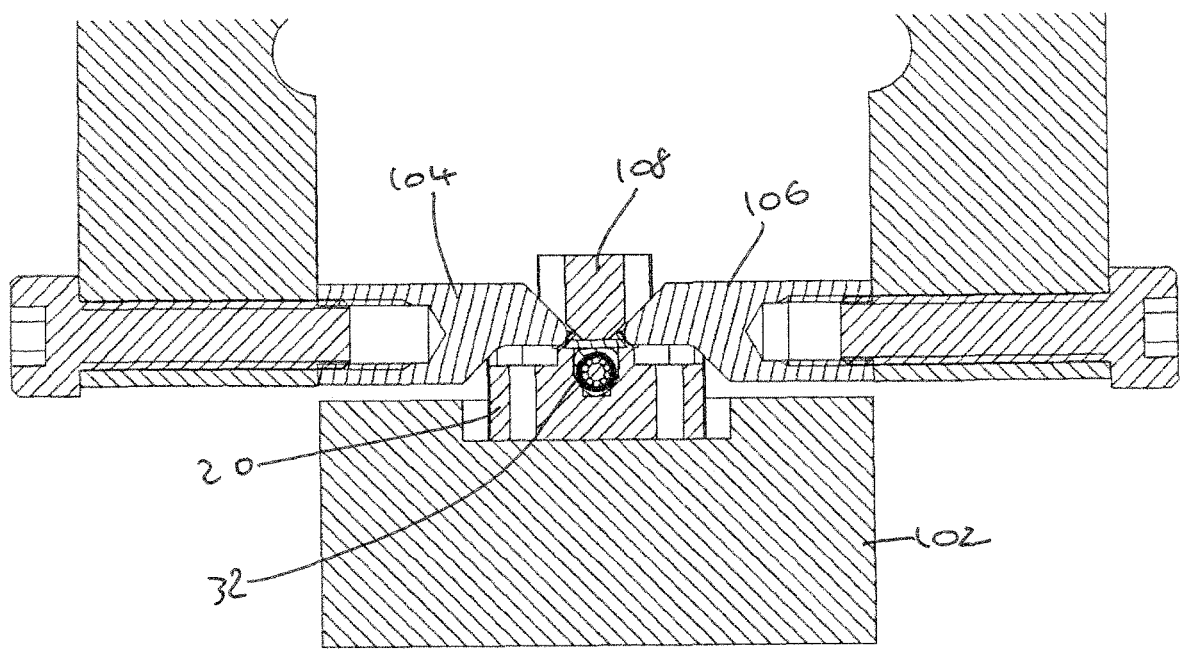
FIG. 6d illustrates a cross-sectional view of the apparatus of FIG. 5 and the readhead of FIGS. 2 to 4, this cross-sectional view being taken at a point through the readhead's cable.

Referring to FIG. 7, there is shown a flowchart 200 illustrating one way of making a readhead according to the invention. In this example, the method initially comprises at step 202 installing all of the relevant components into the body, such as the glass plate 26 (although this could quite easily be done afterwards) and the PCB assembly 24. At step 204, the cable 32 is connected to the PCB assembly 24 by connecting the cable's connector 39 to the PCB assembly's 24 connector 34. Then, at step 206, the body 20 (with the PCB assembly 24 and cable 32) is loaded into the holder 102 and the lid 22 is loaded onto the lid press 108. This arrangement is illustrated in FIG. 6a. The handle 110 is then pulled down which as illustrated in FIG. 6b causes the lid press 108 with the lid 22 to move down toward the body 20 in the holder 102 until the lid 22 is located within the body's 20 perimetral flange 21. This causes the cable 32 to be squashed in the channel 23, between the lid 22 and the body 20, as described above. The handle 110 is then, at step 208, pulled down further which causes the first 104 and second 106 lateral presses to move in toward the body 20 until their tips come into contact and bend the perimetral flange 21 at four discrete locations 25, two of which are at the neck end of the lid 22 and perimetral flange 21 where the cable is located. This is illustrated in FIGS. 6c and 6d. As will be understood, the lid press 108 is held against the lid 22 so as to keep the lid flat (e.g. helps to stop the lid from deforming and hence help ensure that the cable 32 deforms instead) and so as to hold the lid in position within the perimetral flange 21, against the ledge 17 whilst the perimetral flange 21 is crimped in this way. Then, at step 210, the handle is released which causes the first 104 and second 106 lateral presses and the lid press 108 to move away from the body 20 and lid 22 so that the readhead 4 can be removed from the holder 102.

Accordingly, as described above, the lid 22 and the cable 32 are secured to the body 20 without the use of screws or other third party fasteners. Rather the lid 22 and cable 32 are both secured to the body 20 by deforming the body 20, in particular deforming the body 20 so as to impinge on the lid 22. Accordingly, in the embodiment described, there is the double action of the lid 22 and the cable 32 being secured to the body 20 by the crimping of the body 20.

Furthermore, the arrangement described above, with the large opening defined by the perimetral flange 21 which can be closed by the lid 22 means that the PCB assembly 24 can easily be located within the body 24. Furthermore, this, along with the open, U-shaped channel 23, means that the cable 32 with its connector 39 already attached can easily be installed. In other words, with the above described arrangement it is not necessary to feed the cable 32 through a hole in the body 20 and then attach its connector 39.

In the above described embodiments, the position measurement device comprises a position encoder of one sort or another, e.g. incremental or absolute, which operates via optical, magnetic, capacitive or inductive principles. However, as will be understood, the invention also has advantages in other types of device in which a cable needs to be secured, in particular small electronic devices. Other examples include other types of sensors, such as temperature sensors, pressure sensors, probes, for example measurement probes, in particular position measurement probes such as the type used on coordinate positioning apparatus such as coordinate measuring machines (CMMs) and machine tools.

The invention claimed is:

1. A method of assembling a position measurement device comprising an encoder readhead configured to read a scale, the method comprising:
    taking a casing comprising a body having an opening and a lid for the opening,
    locating at least one electronic component within the body;

locating a first end of a cable for electrically connecting the electronic component within the body to an external device;

locating the lid within a perimetral flange that is located on the body; and crimping the body so as to secure the lid to the body and such that the cable is secured to the casing by the lid, and wherein, when the position measurement device is assembled, the cable is directly compressed by the lid and the body.

2. A method as claimed in claim 1, comprising crimping the body at discrete points about the lid so as to secure the lid to the body.

3. A method as claimed in claim 1, the method comprising crimping at least a part of said perimetral flange so as to secure the lid to the body.

4. A method as claimed in claim 1, in which at least one of the lid and body define a channel through which the cable passes, and in which the channel's cross-sectional shape comprises features configured to bite the cable's sheath when the lid is secured onto the body.

5. A method as claimed in claim 1, comprising applying a force onto the lid during said crimping of the body, so as to maintain the position of the lid.

6. A method as claimed in claim 1, in which the cable comprises shielding, and in which when assembled the shielding is electrically connected to the casing.

7. A method as claimed in claim 6, in which the shielding is squeezed between the cable's sheath and the body and/or lid so as to provide said electrical connection.

8. A position measurement encoder readhead configured to read a scale, the readhead comprising:

a casing containing at least one electronic component, the casing comprising a body and a lid located within a perimeter of the body and secured to the body by at least one crimp in the body; and a cable connected at a first end to the at least one electronic component in the casing and having a second end located outside the casing;

wherein the at least one crimp in the body secures the cable to the casing by directly compressing the cable with the lid and the body.

9. The position measurement encoder readhead as claimed in claim 8, wherein the at least one crimp in the body is located on a perimetral flange of the body.

* * * * *